(12) United States Patent
Perez

(10) Patent No.: US 6,639,186 B1
(45) Date of Patent: Oct. 28, 2003

(54) BABY FORMULA WARMING DEVICE

(76) Inventor: Jeffrey J. Perez, 6855 N. Santa Fe Dr., Denver, CO (US) 80221

( * ) Notice: Subject to any disclaimer, the term of this patent is extended or adjusted under 35 U.S.C. 154(b) by 0 days.

(21) Appl. No.: 10/133,272

(22) Filed: Apr. 26, 2002

(51) Int. Cl.[7] .................................................. A47J 36/26
(52) U.S. Cl. ....................... 219/387; 219/438; 126/265
(58) Field of Search ................................. 219/386, 387, 219/438, 439, 429, 430, 432, 433, 435, 436, 437; 126/261, 265

(56) References Cited

U.S. PATENT DOCUMENTS

| | | | |
|---|---|---|---|
| 1,717,132 A | | 6/1929 | Weinmann |
| 1,994,206 A | | 3/1935 | Ziskin et al. |
| 2,194,820 A | * | 3/1940 | Connell et al. ............. 219/433 |
| 2,483,979 A | * | 10/1949 | Morrill ........................ 219/437 |
| 2,500,241 A | | 3/1950 | Brown |
| 2,516,637 A | | 7/1950 | McCollum |
| 2,778,921 A | | 1/1957 | Jepson |
| 3,277,277 A | * | 10/1966 | Wells .......................... 219/441 |
| 3,405,899 A | * | 10/1968 | Trachtenberger et al. ... 219/437 |
| 3,767,898 A | * | 10/1973 | Wells et al. ................. 219/441 |
| 3,983,363 A | * | 9/1976 | Alter .......................... 219/521 |
| 4,430,556 A | * | 2/1984 | Inskip et al. ................ 392/447 |
| D308,154 S | | 5/1990 | Tow |
| 5,118,927 A | * | 6/1992 | Eisenhauer ................. 219/437 |
| 5,508,494 A | * | 4/1996 | Sarris et al. ................ 219/386 |
| 6,528,766 B1 | * | 3/2003 | Parks et al. ................ 219/386 |

* cited by examiner

*Primary Examiner*—Joseph Pelham

(57) ABSTRACT

A baby formula warming device for warming baby formula. The baby formula warming device includes a body member having a perimeter wall. The perimeter wall defines an interior space of the body member. The interior space of the body member is designed for holding the baby formula. A heating assembly is in thermal communication with the interior space of the body member. The heating assembly has a heat transfer member. The heat transfer member extends into the interior space of the body member. The heat transfer member is designed for transferring heat produced by the heating assembly to the baby formula. The heat transfer member is in a spaced relationship from an exterior wall of the perimeter wall of the body member whereby the exterior wall is designed for remaining cool enough to be handled by a user when heat is transferred to the baby formula.

10 Claims, 4 Drawing Sheets

BABY FORMULA WARMING DEVICE

BACKGROUND OF THE INVENTION

1. Field of the Invention

The present invention relates to warmers for nursing bottles and more particularly pertains to a new baby formula warming device for warming baby formula.

2. Description of the Prior Art

The use of warmers for nursing bottles is known in the prior art. U.S. Pat. No. 2,516,637 describes a device for warming nursing bottles. Another type of warmers for nursing bottles is U.S. Pat. No. 2,500,241 having a sectional case with a heating element positioned between the wall of the sectional case for heating baby formula in a nursing bottle. U.S. Pat. No. 1,717,132 has a casing with heating elements positioned around the nursing bottle to heat the baby formula in the nursing bottle. U.S. Pat. No. 1,994,206 having a receptacle with a heating means for heating baby formula a nursing bottle inserted into the receptacle. U.S. Pat. No. Des. 308,154 shows a baby bottle warmer. U.S. Pat. No. 2,778,921 having a device for heating baby formula in a nursing bottle.

While these devices fulfill their respective, particular objectives and requirements, the need remains for a device that includes improved features that allow the user to handle to device without fear of being burned while the baby formula is heating.

SUMMARY OF THE INVENTION

The present invention meets the needs presented above by providing a heat transfer member positioned in the interior space of the body member. The heat transfer member is in a spaced relationship to an exterior wall of body member to minimize the amount of direct heat transfer to the exterior wall that is handled by the user.

Still yet another object of the present invention is to provide a new baby formula warming device that is portable so that baby formula can be heated in a variety of locations.

Even still another object of the present invention is to provide a new baby formula warming device that has a temperature gauge for indicating the temperature of the baby formula as it is being heated.

To this end, the present invention generally comprises a body member having a perimeter wall. The perimeter wall defines an interior space of the body member. The interior space of the body member is designed for holding the baby formula. A heating assembly is in thermal communication with the interior space of the body member. The heating assembly has a heat transfer member. The heat transfer member extends into the interior space of the body member. The heat transfer member is designed for transferring heat produced by the heating assembly to the baby formula in the interior space of the body member. The heat transfer member is in a spaced relationship from an exterior wall of the perimeter wall of the body member whereby the exterior wall is designed for remaining cool enough to be handled by a user when the heat transfer member of the heating assembly transfers heat to the baby formula.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
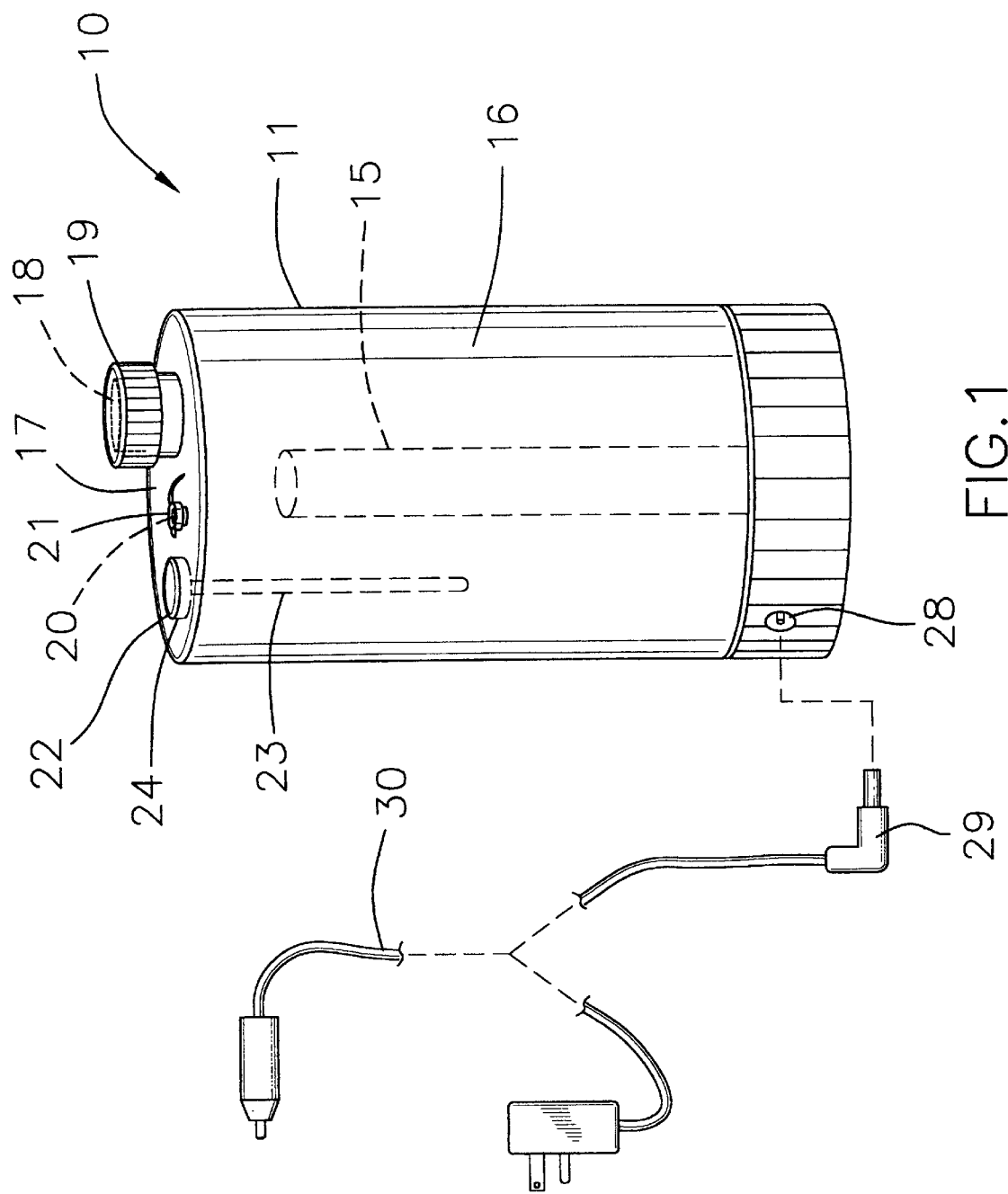
FIG. 1 is a perspective view of a new baby formula warming device according to the present invention.
Figure 2:
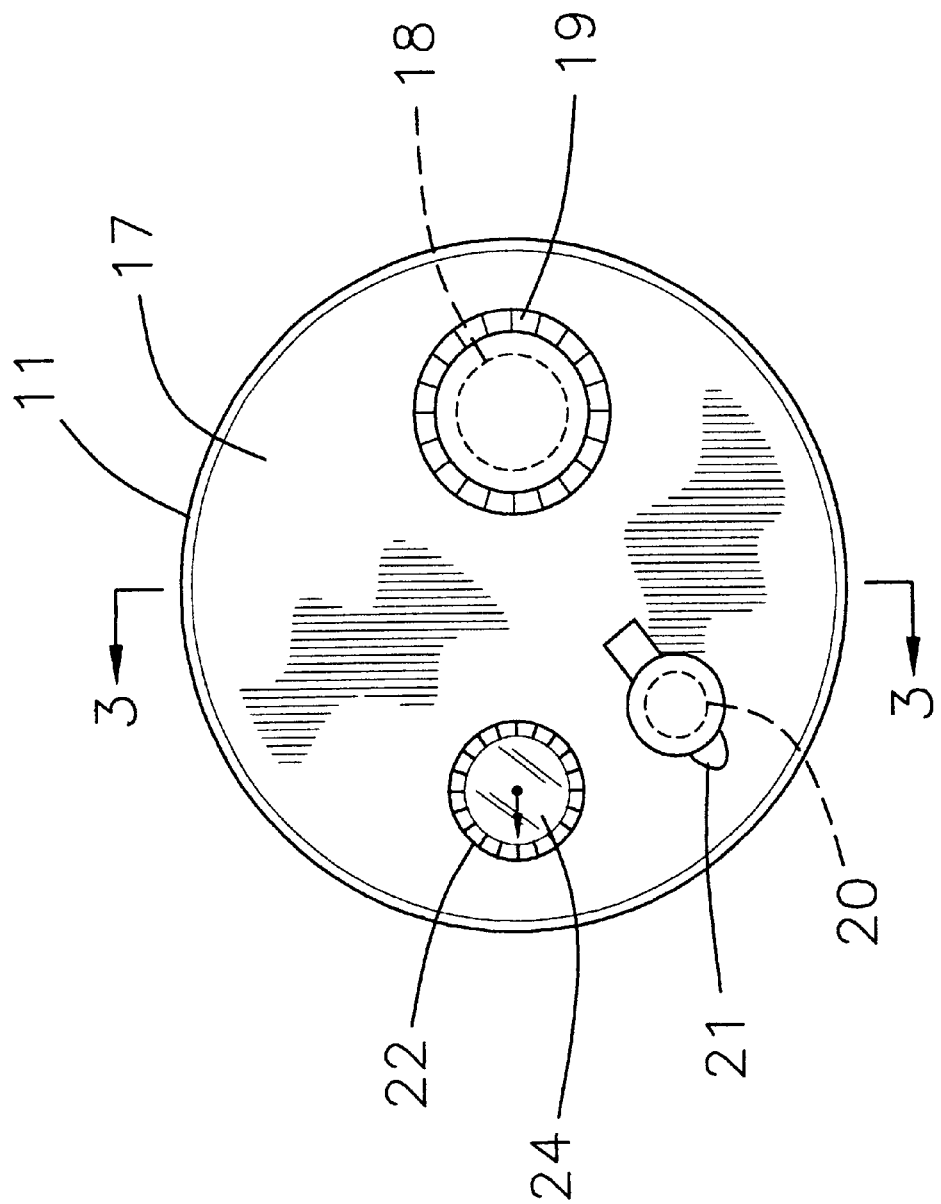
FIG. 2 is a top view of the present invention.
Figure 3:
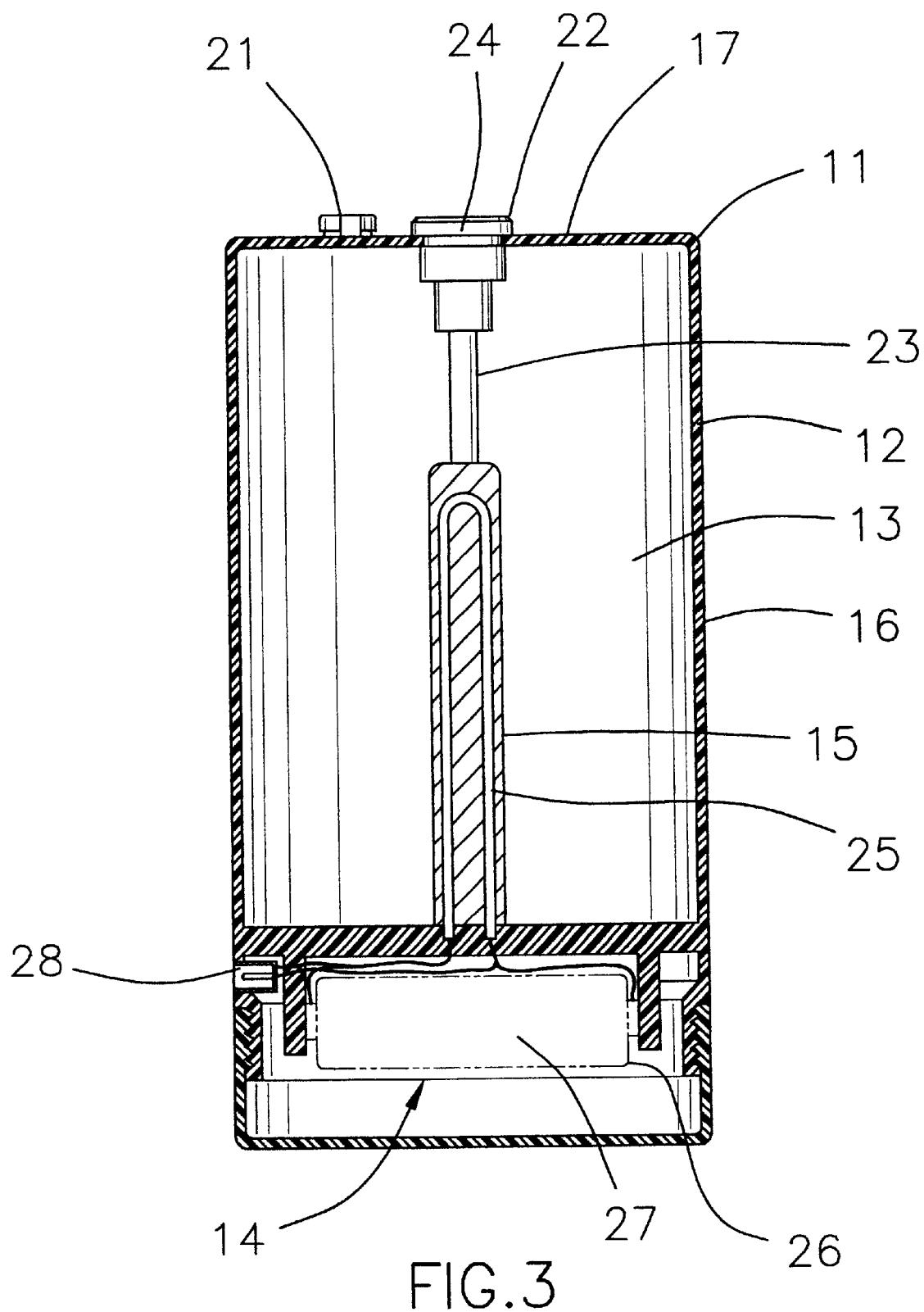
FIG. 3 is a cross-sectional view of the present invention taken along line 3—3 of FIG. 2.
Figure 4:
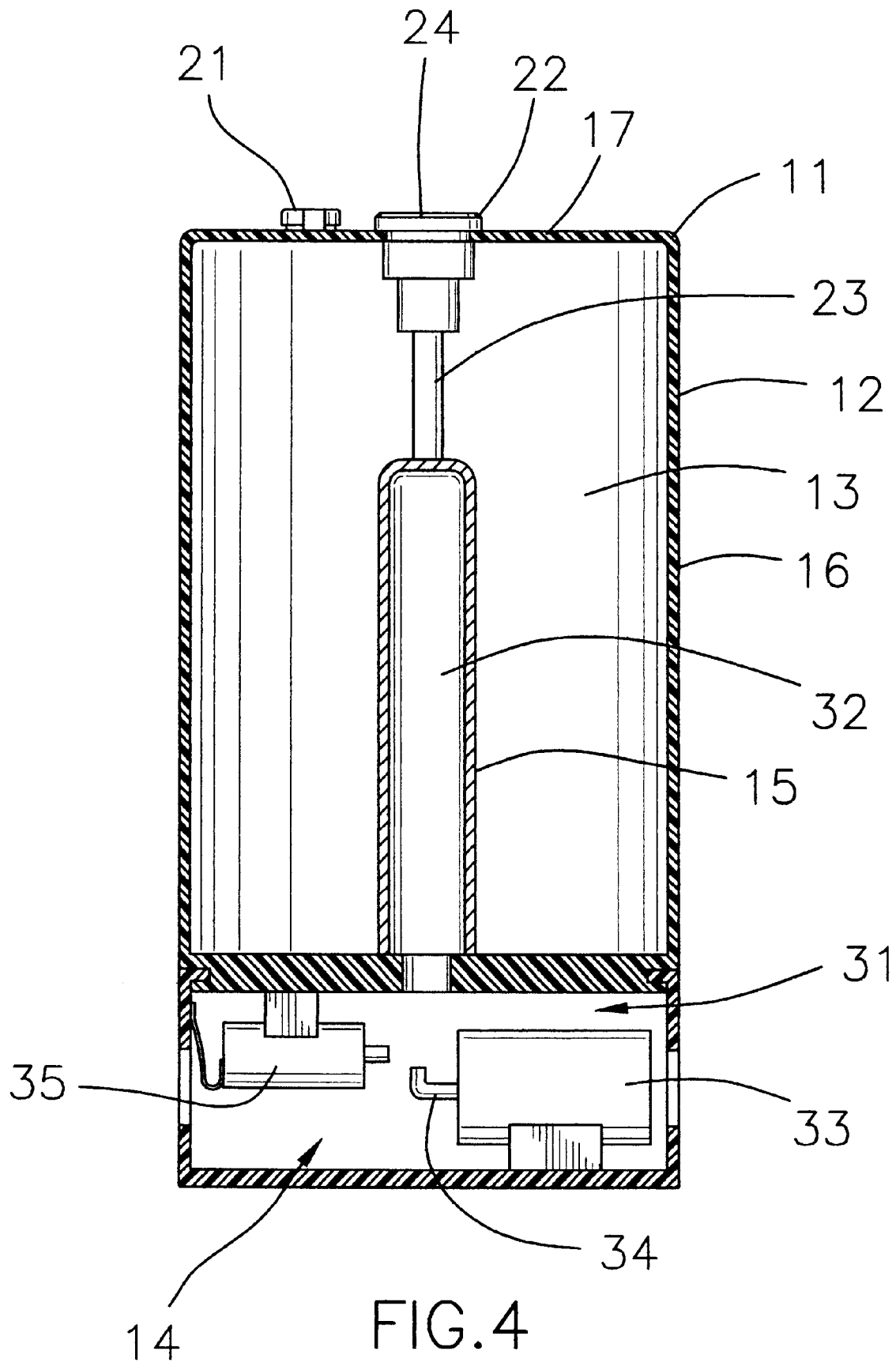
FIG. 4 is a cross-sectional view of an embodiment of the heating assembly of the present invention.

With reference now to the drawings, and in particular to FIGS. 1 through 4 thereof, a new baby formula warming device embodying the principles and concepts of the present invention and generally designated by the reference numeral 10 will be described.

As best illustrated in FIGS. 1 through 4, the baby formula warming device 10 generally comprises a body member 11 having a perimeter wall 12. The perimeter wall 12 defines an interior space 13 of the body member 11. The interior space 13 of the body member 11 is designed for holding the baby formula.

A heating assembly 14 is in thermal communication with the interior space 13 of the body member 11. The heating assembly 14 has a heat transfer member 15. The heat transfer member 15 extends into the interior space 13 of the body member 11. The heat transfer member 15 is designed for transferring heat produced by the heating assembly 14 to the baby formula in the interior space 13 of the body member 11. The heat transfer member 15 is in a spaced relationship from an exterior wall 16 of the perimeter wall 12 of the body member 11 whereby the exterior wall 16 is designed for remaining cool enough to be handled by a user when the heat transfer member 15 of the heating assembly 14 transfers heat to the baby formula.

The perimeter wall 12 of the body member 11 has a top wall 17. The top wall 17 has a fill aperture 18 extending through the top wall 17 of the body member 11. The fill aperture 18 is designed for permitting the user to pour the baby formula into and out of the interior space 13 of the body member 11.

A filler cap 19 is selectively coupled to the top wall 17 of the body member 11. The filler cap 19 is selectively positionable over the fill aperture 18 when the filler cap 19 is coupled to the top wall 17 of the body member 11. The filler cap 19 is designed for retaining the baby formula in the interior space 13 of the body member 11 when the filler cap 19 is coupled to the top wall 17.

The top wall 17 of the body member 11 has a vent aperture 20 extending through the top wall 17 of the body member 11. The vent aperture 20 is designed for venting air from the interior space 13 of the body member 11 when the baby formula is being poured out of the fill aperture 18 for preventing a vacuum being formed and disrupting the flow of the baby formula from the interior space 13 of the body member 11.

A vent cap 21 is selectively coupled to the top wall 17 of the body member 11. The vent cap 21 is selectively positionable over the vent aperture 20 when the vent cap 21 is coupled to the top wall 17 of the body member 11. The vent cap 21 is designed for retaining the baby formula in the interior space 13 of the body member 11 when the vent cap 21 is coupled to the top wall 17.

A temperature gauge 22 has a probe portion 23 and a display portion 24. The temperature gauge 22 is coupled the body member 11. The probe portion 23 of the temperature gauge 22 extends into the interior space 13 of the body member 11 whereby the probe portion 23 is designed for being in thermal communication with the baby formula in the interior space 13 of the body member 11. The display portion 24 is operationally coupled to the probe portion 23 whereby the display portion 24 is designed for displaying a temperature of the baby formula sensed by the probe portion 23.

The heating assembly 14 has a heating element 25. The heating element 25 is positioned in the heat transfer member 15. The heating element 25 is operationally coupled to a power source 26. The power source 26 is for providing power to the heating element 25 whereby the heating element 25 emits heat designed for heating the baby formula.

The power supply of the heating assembly 14 comprises at least one battery 27. The battery 27 is operationally coupled to the heating element 25 whereby the battery 27 is for supplying power to the heating element 25.

The heating assembly 14 has a remote power jack 28. The remote power jack 28 is operationally coupled between the power source 26 and the heating element 25. The remote power jack 28 selectively receives an input end 29 of a power cord 30. The power cord 30 is designed for selectively coupling to an external electrical source, such as a building outlet or a vehicle power tap, whereby the power cord 30 is for providing power to the heating element 25 when the remote power jack 28 receives the input end 29 of the power cord 30 and the power cord 30 is coupled to the external electrical source.

In an embodiment, the heating assembly 14 has a flame producing means 31 for producing a flame designed for heating the baby formula in the interior space 13 of the body member 11. The heat transfer member 15 of the heating assembly 14 has a cavity 32 whereby the flame producing means 31 is designed for heating air in the cavity 32 of the heat transfer member 15 for heating the baby formula in the interior space 13 of the body member 11. The flame producing means 31 has a gas storage member 33 coupled to an outlet nozzle 34. The gas storage member 33 is refillable for future use. The flame producing means 31 also has a spark generator member 35 for generating a spark to ignite flammable gas being released from the outlet nozzle 34 when the spark generator member is actuated by the user.

In use, the user pours the formula into the interior space 13 of the body member 11 through the filler aperture in the top wall 17 of the body member 11. The filler cap 19 is the coupled to the top wall 17 over the filler aperture to prevent the baby formula from being spilled. The power cord 30 is then plugged in or the power supply supplies power to the heating element 25 to heat the baby formula in the interior space 13. The user then watches the display portion 24 of the temperature gauge 22 to see when the baby formula has reached a desired temperature and then dispenses the baby formula from the interior space 13 of the body member 11 to be consumed by a child.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A baby formula warming device for warming baby formula to be consumed by a child, the baby formula warming device comprising;
   a body member having a perimeter wall, said perimeter wall defining an interior space of said body member, said interior space of said body member being adapted for holding the baby formula;
   a heating assembly being in thermal communication with said interior space of said body member, said heating assembly having a heat transfer member, said heat transfer member extending into said interior space of said body member, said heat transfer member being adapted for transferring heat produced by said heating assembly to the baby formula in said interior space of said body member, said heat transfer member being in a spaced relationship from an exterior wall of said perimeter wall of said body member such that said exterior wall is adapted for remaining cool enough to be handled by a user when said heat transfer member of said heating assembly transfers heat to the baby formula; and
   a temperature gauge having a probe portion and a display portion, said temperature gauge being coupled said body member, said probe portion of said temperature gauge extending into said interior space of said body member such that said probe portion is adapted for being in thermal communication with the baby formula in said interior space of said body member, said display portion being operationally coupled to said probe portion such that said display portion is adapted for displaying a temperature of the baby formula sensed by said probe portion, said display portion of said temperature gauze being positioned substantially parallel to a top wall of said body member such that said display portion does not inhibit use of said body member by the user.

2. The baby formula warming device as set forth in claim 1, further comprising:
   said top wall of said perimeter wall having a fill aperture extending through said top wall of said body member, said fill aperture being adapted for permitting the user to pour the baby formula into and out of said interior space of said body member.

3. The baby formula warming device as set forth in claim 2, further comprising:
   a filler cap being selectively coupled to said top wall of said body member, said filler cap being selectively positionable over said fill aperture when said filler cap is coupled to said top wall of said body member, said filler cap being adapted for retaining the baby formula in said interior space of said body member when said filler cap is coupled to said top wall.

4. The baby formula warming device as set forth in claim 2, further comprising:

said top wall of said body member having a vent aperture extending through said top wall of said body member, said vent aperture being adapted for venting air from said interior space of said body member when the baby formula is being poured out of said fill aperture for preventing a vacuum being formed and disrupting the flow of the baby formula from said interior space of said body member.

5. The baby formula warming device as set forth in claim 4, further comprising:

a vent cap being selectively coupled to said top wall of said body member, said vent cap being selectively positionable over said vent aperture when said vent cap is coupled to said top wall of said body member, said vent cap being adapted for retaining the baby formula in said interior space of said body member when said vent cap is coupled to said top wall.

6. The baby formula warming device as set forth in claim 1, further comprising:

said heating assembly having a heating element, said heating element being positioned in said heat transfer member, said heating element being operationally coupled to a power source, said power source being for providing power to said heating element such that said heating element emits heat adapted for heating the baby formula.

7. The baby formula warming device as set forth in claim 6, further comprising:

said power supply of said heating assembly comprising at least one battery, said battery being operationally coupled to said heating element such that said battery is for supplying power to said heating element.

8. The baby formula warming device as set forth in claim 6, further comprising:

said heating assembly having a remote power jack, said remote power jack being operationally coupled between said power source and said heating element, said remote power jack selectively receiving an input end of a power cord, said power cord being adapted for selectively coupling to an external electrical source such that said power cord is for providing power to said heating element when said remote power jack receives said input end of said power cord and said power cord is coupled to the external electrical source.

9. The baby formula warming device as set forth in claim 1, further comprising:

said heating assembly having a flame producing means for producing a flame adapted for heating the baby formula in said interior space of the body member, said heat transfer member of said heating assembly having a cavity such that said flame producing means is adapted for heating air in said cavity of said heat transfer member for heating the baby formula in said interior space of said body member.

10. A baby formula warming device for warming baby formula to be consumed by a child, the baby formula warming device comprising;

a body member having a perimeter wall, said perimeter wall defining an interior space of said body member, said interior space of said body member being adapted for holding the baby formula;

a heating assembly being in thermal communication with said interior space of said body member, said heating assembly having a heat transfer member, said heat transfer member extending into said interior space of said body member, said heat transfer member being adapted for transferring heat produced by said heating assembly to the baby formula in said interior space of said body member, said heat transfer member being in a spaced relationship from an exterior wall of said perimeter wall of said body member such that said exterior wall is adapted for remaining cool enough to be handled by a user when said heat transfer member of said heating assembly transfers heat to the baby formula;

said perimeter wall of said body member having a top wall, said top wall having a fill aperture extending through said top wall of said body member, said fill aperture being adapted for permitting the user to pour the baby formula into and out of said interior space of said body member;

a filler cap being selectively coupled to said top wall of said body member, said filler cap being selectively positionable over said fill aperture when said filler cap is coupled to said top wall of said body member, said filler cap being adapted for retaining the baby formula in said interior space of said body member when said filler cap is coupled to said top wall;

said top wall of said body member having a vent aperture extending through said top wall of said body member, said vent aperture being adapted for venting air from said interior space of said body member when the baby formula is being poured out of said fill aperture for preventing a vacuum being formed and disrupting the flow of the baby formula from said interior space of said body member;

a vent cap being selectively coupled to said top wall of said body member, said vent cap being selectively positionable over said vent aperture when said vent cap is coupled to said top wall of said body member, said vent cap being adapted for retaining the baby formula in said interior space of said body member when said vent cap is coupled to said top wall;

a temperature gauge having a probe portion and a display portion, said temperature gauge being coupled said body member, said probe portion of said temperature gauge extending into said interior space of said body member such that said probe portion is adapted for being in thermal communication with the baby formula in said interior space of said body member, said display portion being operationally coupled to said probe portion such that said display portion is adapted for displaying a temperature of the baby formula sensed by said probe portion, said display portion of said temperature gauge being positioned substantially parallel to a top wall of said body member such that said display portion does not inhibit use of said body member by the user;

said heating assembly having a heating element, said heating element being positioned in said heat transfer member, said heating element being operationally coupled to a power source, said power source being for providing power to said heating element such that said heating element emits heat adapted for heating the baby formula;

said power supply of said heating assembly comprising at least one battery, said battery being operationally coupled to said heating element such that said battery is for supplying power to said heating element; and said heating assembly having a remote power jack, said remote power jack being operationally coupled between said power source and said heating element, said remote power jack selectively receiving an input end of a power cord, said power cord being adapted for selectively coupling to an external electrical source such that said power cord is for providing power to said heating element when said remote power jack receives said input end of said power cord and said power cord is coupled to the external electrical source.

* * * * *